3,110,776
TIMER SWITCHING MECHANISM
Gerald W. Hogan and Hugo H. Ovando, Napa, Calif., assignors to Kaiser Steel Corporation, Oakland, Calif., a corporation of Nevada
Filed May 23, 1960, Ser. No. 30,788
9 Claims. (Cl. 200—38)

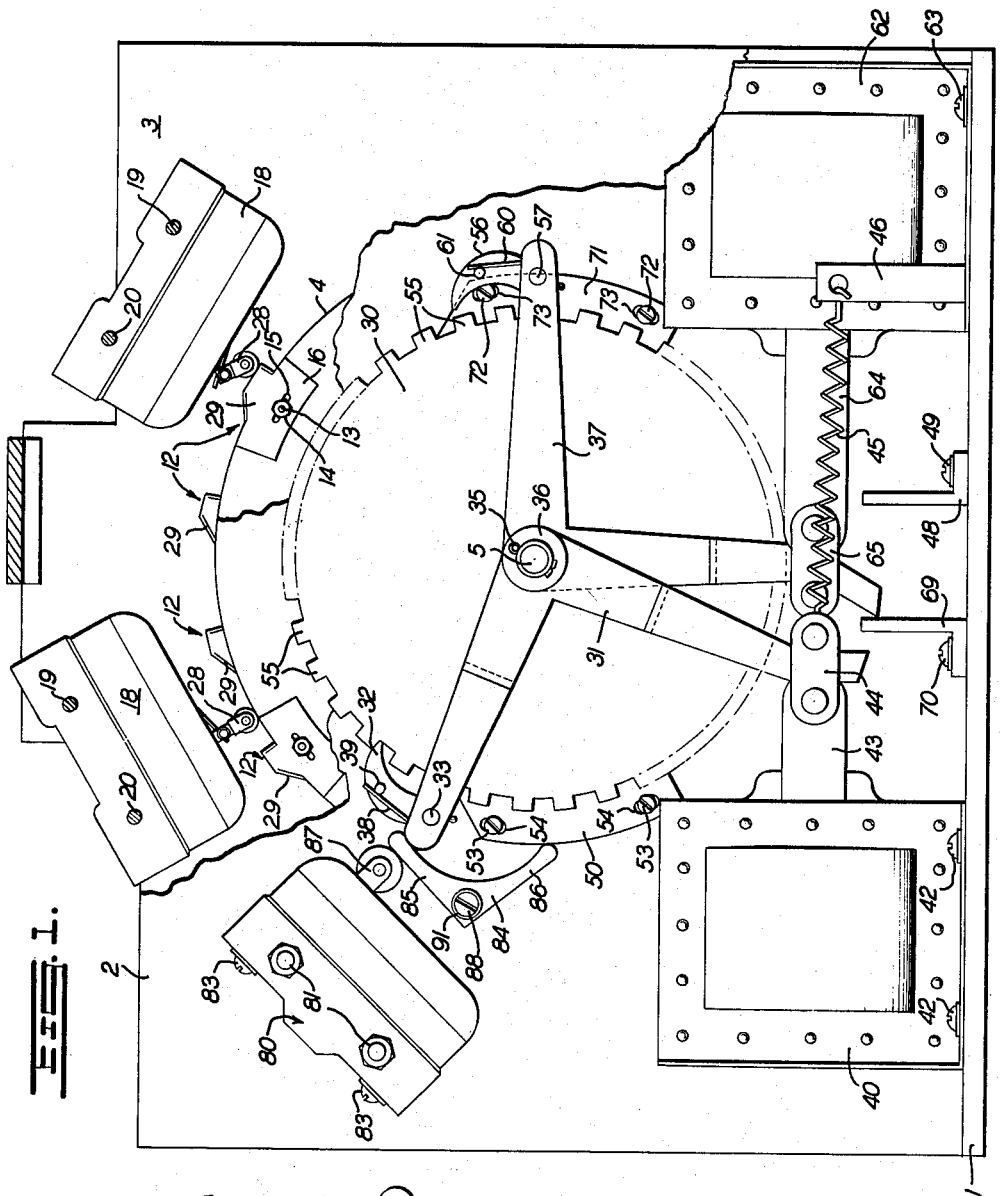

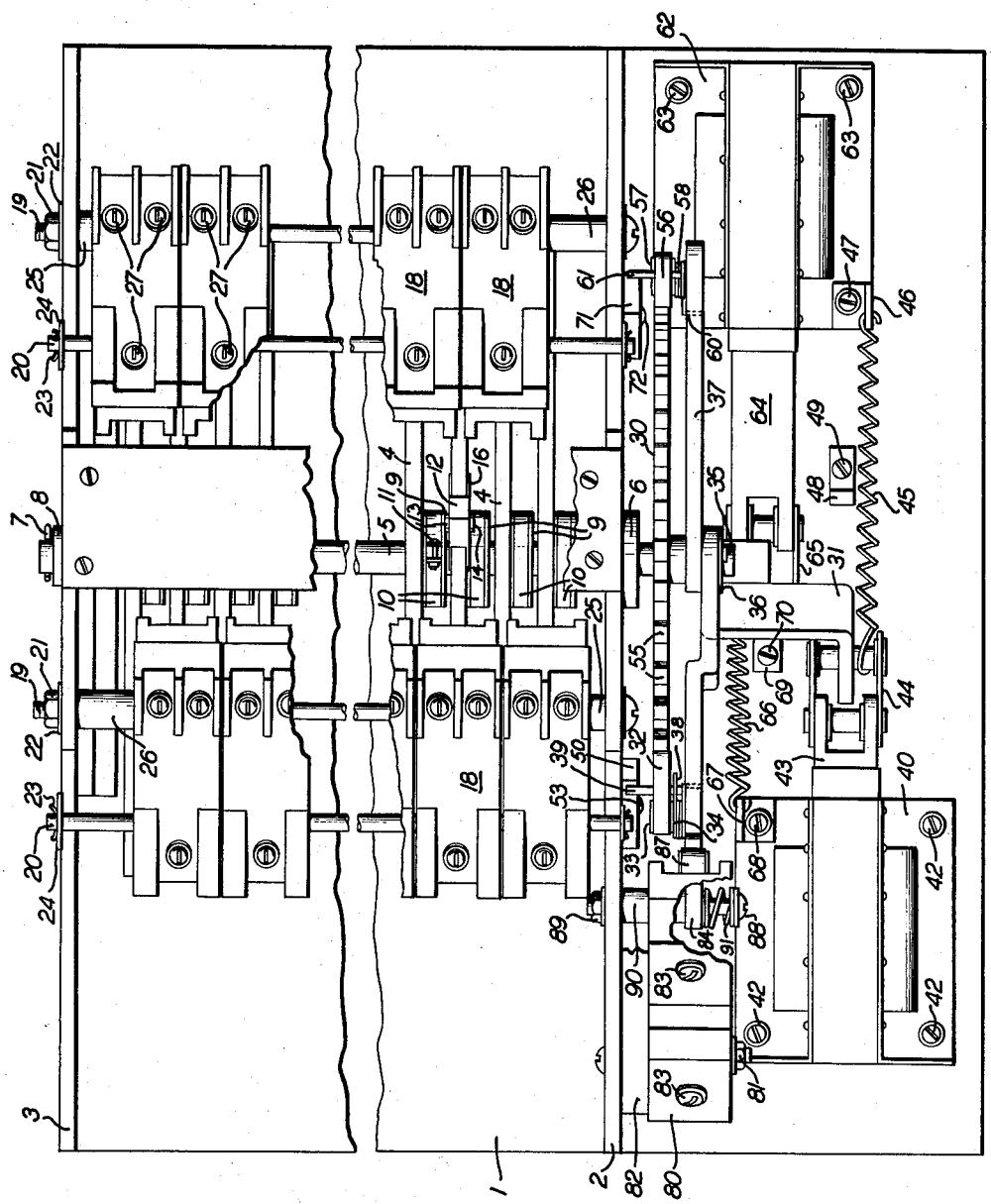

This invention relates to automatic or semi-automatic cycle switch devices. More particularly, this invention relates to a cycle switch assembly adapted to provide opening or closing of different electrical circuits in accordance with a predetermined sequence or program.

Various sequencing or cycle switches have been devised in the past for automatically or semi-automatically controlling the sequential operations of an electrically controlled multiple function machine, such as opening and closing solenoid valves to actuate the different sprays of an ornamental water fountain, or opening and closing various lighting circuits to produce interesting sequential colored lighting effects for theatres, restaurants, display windows, etc. Such prior art devices possess certain inherent disadvantages because of their lack of flexibility and excessive size. For example, with prior art devices, it is generally necessary to change parts in order to change cycle intervals. Moreover, such prior art devices generally rotate in only one direction and thus, are limited by the number of operation steps which can be obtained thereby. A full 360° of rotation must be completed to reset these devices.

Accordingly, it is a purpose of this invention to provide an improved cycle or sequencing switching device wherein a substantial number of cycle steps may be controlled by a relatively compact unit which may operate either in a clockwise or counterclockwise direction. In the instant device, the cycle step intervals may be changed by a simple adjustment and continuous stepping to a selected cycle position effected from either operating direction.

The various advantages of the invention will become more apparent from a review of the following detailed description when taken in conjunction with the accompanying drawings wherein:

FIGURE 1 is a fragmentary front elevational view of the cycle switch device of the instant invention with parts thereof removed for purposes of clarity;

FIGURE 2 is a broken fragmentary plan view of the cycle switch device of FIGURE 1 with parts removed for purposes of clarity; and FIGURE 3 is a simplified schematic diagram of one suitable type of electrical circuit which may be employed with the cycle switch device of this invention for effecting a sequential control of a multiple function machine, lighting display device, etc.

Referring to the drawings in which the same reference numerals have been applied to like parts in the various views and particularly to FIGURES 1 and 2, it will be observed that the switching device of the instant invention generally includes a suitable framework comprised of a base plate 1, a front plate 2 and a back plate 3 affixed by suitable means such as by welding or bonding to base plate 1 and at right angles thereto. A plurality of cam wheels 4 are mounted on a shaft 5 which passes through the centers of said wheels. The openings in wheels 4 are of a diameter substantially the same as that of shaft 5. Shaft 5 may be advantageously mounted centrally in plates 2 and 3 by means of suitable bearings (not shown) with the end supported in plate 2 extending beyond plate 2 an appreciable distance to permit mounting of other elements of the device. Shaft 5 is maintained in position adjacent plate 2 by means of a collar 6 and adjacent plate 3 by means of a cotter pin 7 and washer 8.

Cam wheels 4 are maintained in fixed position relative to shaft 5 by means of compression collars 9 suitably affixed to one side of each wheel. Compression collars 9 are in the form of opposing circular segments positioned on either side of and adjacent to the openings in wheels 4 through which shaft 5 passes. The inside diameters of the compression collars are substantially the same as the diameter of shaft 5. Compression collars 9 are clamped onto shaft 5 by means of clamps 10, which are affixed and tightened by bolt and nut assemblies 11.

Suitable cam elements 12 are adjustably mounted in synchronized relation one to the other on the edges of cam wheels 4 by means of bolts 13 and nuts 14, the bolts 13 passing through elongated openings 15 provided in flanges 16 of cam elements 12. By means of the elongated openings 15, the cam elements 12 may be easily adjusted by loosening bolts 13 and nuts 14.

A plurality of suitable electric switches such as conventionl microswitches 18 are mounted above cam wheels 4 in a position whereby microswitches 18 may be actuated by cam elements 12. Since the microswitches 18 are substantially wider than the cam wheels 4, the microswitches 18 are mounted in two parallel banks or rows rather than one thus providing an apparatus of half the normal length required for a given number of sequential operations. Each row of microswitches 18 is mounted on a bolt 19 and a rod 20 passing through the bodies of the microswitches and through plates 2 and 3. Bolts 19 are maintained in position by nuts 21 and washers 22, while rods 20 are maintained in position by means of cotter pins 23 and washers 24. The microswitches 18 are maintained in position on bolts 19 and rods 20 by means of spacers 25 and 26. Electrical connection of microswitches 18 in their respective circuits is accomplished by suitable means such as terminal screws 27 mounted on microswitches 18. The microswitches 18 shown in FIGURES 1 and 2 are single pole double throw switches. Thus by proper selection of the terminal screws 27 when making the electrical connections each microswitch 18 may be employed as a normally closed switch, a normally open switch or as a single pole double throw switch depending on the electrical circuits being controlled. It is to be understood that it is within the scope of this invention to employ multipole switches, single throw switches, etc., in lieu of the single pole double throw microswitches 18 shown.

Microswitches 18 may be provided with reverse skip switch actuators 28. As can be seen from FIGURE 1 of the drawing, actuators 28 actuate their respective microswitches 18 when engaged by cam elements moving in a counterclockwise direction. However, actuators 28 merely pivot at their upper end when the cam element moves in a clockwise direction as illustrated by the right hand switch of FIGURE 1. While the microswitches 18, shown in FIGURE 1, have skip switch actuators 28 which do not actuate the microswitches when the cam elements move in a clockwise direction, some or all of the microswitches 18 could have actuators, which skip, when the respective cam elements 12 moves in a counterclockwise direction. In addition, some or all of the microswitches could have standard microswitch actuators which would operate regardless of the direction of movement of the cam elements. Accordingly, the type of actuators employed would depend on the sequences desired and the operations being controlled. This provides for substantial flexibility in the type of operations which may be controlled by the cycle switch device of this invention. With standard microswitch actuators, cam elements 12 would require two tapered sides 29 rather than just one as shown in FIGURE 1.

Operation of the switch mechanism, i.e., rotation of the cam wheels 4 and shaft 5, is accomplished by two reciprocating pawl and ratchet wheel stepping devices each of which rotates shaft 5 in a predetermined direction, one such mechanism being employed for clockwise rotation of cam wheels 4 and one for counterclockwise rotation thereof. The device for rotating the shaft 5 in a clockwise direction comprises a ratchet wheel 30 affixed to shaft 5 by suitable means, a rocker arm 31 which can be pivotally mounted on shaft 5 by suitable bearing means (not shown) and a pawl 32 pivotally mounted at one end of rocker arm 31 by means of a rivet 33 and a spacer 34. A cotter pin 35 and washer 36 are provided on the rocker arm end of shaft 5 to maintain rocker arms 31 and 37 on shaft 5. Pawl 32 is adapted to engage ratchet wheel 30 to advance cam elements 12 in the clockwise direction. A torsion spring 38 encompasses spacer 34, one end of spring 38 engaging arm 31 and the other end engaging one end of a pin 39 which is affixed to pawl 32. Thus, torsion spring 38 tends to urge the tip of pawl 32 toward ratchet wheel 30.

Means are provided for electromagnetically, pneumatically or hydraulically actuating rocker arm 31 and pawl 32. In this embodiment these means comprise a pull-type solenoid 40 mounted on base plate 1 by means of machine screws 42. Solenoid 40 has a pull arm 43, link means 44 and an opposing tension spring 45. Spring 45 is affixed at its opposite end to a spring holder 46 which in turn is affixed to base plate 1 by means of a machine screw 47. The lower end portion of rocker arm 31 is engaged in link 44 and is held against a stop 48 by spring 45 when solenoid 40 is de-energized. Stop 48 is suitably mounted on plate 1 by machine screw 49.

An adjustable cam 50 operatively associated with pawl 32 is mounted on plate 2 by means of machine screws 53 passing through elongated openings 54 provided in cam 50 and threaded into plate 2. The end of pin 39 opposite that engaged by torsion spring 38 engages the surface of cam 50. The position of cam 50 relative to pin 39 is such that through the action of torsion spring 38 movement of the tip of the pawl toward and away from ratchet wheel 30 during movement of rocker arm 31 is controlled by the surface of cam 50. Cam 50 may be adjusted by loosening screws 53, moving the cam 50 and retightening screws 53. Adjustment of the position of cam 50 relative to pin 39, as above described, determines whether pawl 32 engages each tooth 55, every other tooth or every third tooth of the ratchet wheel 30 as a result of the reciprocation of arm 31 and pawl 32 and thus, determines the number of degrees of rotation of ratchet wheel 30 and cam wheels 4 for every stroke of rocker arm 31.

The stepping device for the counterclockwise rotation of ratchet wheel 30 and cam wheels 4 is substantially identical to that described above for clockwise rotation and accordingly, requires only a brief description. This device comprises a rocker arm 37 similar to rocker arm 31 but having a slightly different shape to permit positioning between rocker arm 31 and ratchet wheel 30. A pawl 56 is pivotally mounted on the end of rocker arm 37 by means of a rivet 57 and spacer 58. The tip of pawl 56 is urged toward ratchet wheel 30 by means of a torsion spring 60 acting through one end of a pin 61 affixed to pawl 56 and passing therethrough in the same manner as the pin 39 above described. Rocker arm 37 is actuated by a pull-type solenoid 62, suitably mounted on plate 1 by means of machine screws 63 through the medium of a pull arm 64, a link means 65 engaging the lower end portion of rocker arm 37, an opposing spring 66 and a spring holder 67 affixed to base plate 1 by a machine screw 68. A stop 69, suitably mounted on plate 1 by a machine screw 70, is provided to stop the left-hand movement of arm 37 when solenoid 62 is not energized. An adjustable cam 71 is mounted on plate 2 by means of machine screws 72 and elongated openings 73 provided in cam 71. The control of the movement of pawl 56 by cam 71 through pin 61 is the same as that above described for the clockwise stepping mechanism and accordingly, will not be described in detail.

Operation of the clockwise stepping mechanism is as follows: When current is supplied to solenoid 40 from a suitable source, as indicated in FIGURE 3, the pull arm 43 is moved to the left against the tension of spring 45 whereby a forward stroke is imparted to pawl 32 in a clockwise direction. The end of the pawl 32 is forced down between a pair of teeth 55 of ratchet wheel 30 by torsion spring 38 whereby the pawl will engage one of the teeth. When solenoid 40 is de-energized by opening a switch in a manner to be described more fully hereinafter, spring 45 moves the lower end of rocker arm 31 to the right to stop 48. This causes a retraction of pawl 32 moving it in a counterclockwise direction. As the pawl 32 is retracted, the pin 39 moves up on the surface of cam 50 bringing the end of the pawl 32 out from between teeth 55 of ratchet wheel 30.

When the solenoid 40 is again energized, the pawl 32 moves into the next space between teeth 55 permitted by cam 50 when the pin 39 moves down the sloping surface of cam 50. The end of pawl 32 is always urged toward ratchet wheel 30 by torsion spring 38 and is only prevented from contacting the ratchet wheel on the retracted portion of its stroke by the surface of cam 50 in contact with pin 39 of pawl 32. When cam 50 is in its most clockwise position, the pawl 32 will move the ratchet wheel only 1 step per stroke since cam 50 and pin 39 prevent the pawl from engaging a tooth 55 any further back along ratchet wheel 30. When the cam is in its mid position, the pawl will skip one tooth 55 and engage the second tooth back on each stroke and thus, will move the ratchet wheel 30 forward or clockwise a distance equivalent to two teeth per stroke. With the cam 50 in its maximum counterclockwise position, the pawl 32 may skip two teeth 55 and engage the third tooth back thus moving the ratchet wheel forward a distance of three teeth per stroke. The counterclockwise stepping mechanism operates in the same manner as the clockwise stepping mechanism and accordingly, such operation will not be described in detail.

An automatic means for continuously stepping the clockwise stepping mechanism is shown in the drawings. While such means is not shown for the counterclockwise mechanism, such means could be employed with the counterclockwise as well as the clockwise mechanism if the operations to be sequentially controlled could advantageously use such automatic stepping. The structure and operation of said additional device would be substantially identical to the one to be described. This automatic means comprises a normally closed electric switch such as a conventional microswitch 80 mounted on plate 2 by means of bolt and nut assemblies 81 with a spacer 82 being disposed between microswitch 80 and plate 2. Electrical connection of microswitch 80 in the desired circuit is accomplished by suitable means such as terminal screws 83 mounted on microswitch 80. Microswitch 80 is operatively associated with a lever 84 having two legs 85 and 86 disposed at an angle to one another pivotally mounted on plate 2 in a position whereby leg 85 is located between the pawl end of rocker arm 31 and the actuator 87 of switch 80. Thus, the pawl end of arm 31 is adapted to engage actuator 87 and actuate microswitch 80 as a result of the forward or clockwise movement of rocker arm 31. The lever 84 is mounted on plate 2 by means of a bolt 88 passing through lever 84 at a point intermediate the extremities of legs 85 and 86 and a nut 89 with a spacer 90 interposed between lever 84 and plate 2 and with a compression spring 91 interposed between the head of the bolt 88 and lever 84. The spring 91 exerts a force against the side of lever 84 thus providing a substantial amount of friction between spring 91, lever 84 and spacer 90 whereby an appreciable force is required to pivotally move lever 84 about bolt 88.

The automatic stepping means operates in the following manner: Switch 80 is electrically connected in the supply circuit for solenoid 40 whereby when the actuator 87 of switch 80 is depressed the circuit supplying current to solenoid 40 is opened. Thus, when the rocker arm 31 is in its retracted position, actuator 87 is not depressed, whereby switch 80 is closed and solenoid 40 is energized. When solenoid 40 is energized, the pawl end of rocker arm 31 is moved in a clockwise direction in the manner described above whereby the pawl end of rocker arm 31 engages leg 85 of lever 84 moving leg 85 pivotally about bolt 88 into engagement with actuator 87 of switch 80 and opening switch 80. When switch 80 is opened, the current supplied to solenoid 40 is cut off and spring 45 moves rocker arm 31 counterclockwise. This in turn causes a movement of the pawl end thereof away from the actuator 87 of switch 80 and the leg 85 of lever 84. However, due to the friction between lever 84 and spacer 90 resulting from the force of compression spring 91, actuator 87 tends to maintain switch 80 in an open position during the counterclockwise movement of rocker arm 31. Upon completion of its withdrawal, the pawl end of rocker arm 31 moves leg 86 of lever 84 pivotally thereby forcing leg 85 to move in a clockwise direction away from actuator 87. This produced a releasing of actuator 87 of switch 80 so that switch 80 is closed thus energizing solenoid 40 and repeating the cycle.

An example of the use of the cycle switch of this invention in the semi-automatic operation of a complex machine performing several operations in a predetermined sequence will now be described. For this particular operation, all of the switches 18 with the exception of one are advantageously equipped with reverse skip actuators 28. Thus, while the switches are actuated when the cams rotate in a counterclockwise direction, they are not actuated when the cams rotate in a clockwise direction. The switch which is not a reverse skip switch is indicated in FIGURE 3 by the number 100. This switch could be any one of the microswitches 18. A modified cam element 12 would be required to actuate this switch as previously mentioned. In this example, all the steps in the operating sequence are accomplished by rotating the cams 4 in the counterclockwise direction. The ratchet wheel 30 employed by way of example has 36 teeth and thus, 36 steps could be accomplished by rotating in a single direction. If the number of operations to be performed with this specific ratchet wheel is between 18 and 36, the cam 71 would be adjusted to its most clockwise position whereby every tooth 55 of the ratchet wheel 30 is engaged by pawl 56. If the desired number of steps is between 18 and 12, the cam 71 would be adjusted to its intermediate position whereby every other tooth of the ratchet wheel 30 would be engaged by pawl 56. If it is desired to have less than 12 steps, the cam 71 would be adjusted to its most counterclockwise position whereby every third tooth of the ratchet wheel 30 would be engaged by pawl 56. The cam elements 12 are positioned on the cam wheels 4 in such relation to each other that for each stroke of the rocker arm 37 some change is made in the operation of the machine being controlled by the cycle switch.

Referring now, particularly, to the schematic electrical diagram FIGURE 3, the operation of the cycle switch as employed in this example will now be described. It is to be noted that this electrical diagram is only illustrative of a suitable circuit for operating the cycle switch in accordance with this example.

To start the cycle, momentary contact switch 101 is depressed. This completes the circuit to solenoid 62 thereby energizing solenoid 62 whereby a single stroke is imparted to rocker arm 37 rotating cam wheels 4 through the medium of pawl 56, ratchet wheel 30 and shaft 5 to the first position. At least one of the microswitches 18 is thus actuated by its associated cam element 12 thereby initiating the first step of the desired sequence of operations. As the time or the condition of the article being operated upon reaches the stage where the second operation is required, switch 101 is again depressed and as each succeeding operation becomes due, switch 101 is depressed. Thus, the entire sequence of operations may be carried out simply by depressing switch 101 at the proper times and the mechanism automatically closes and opens the proper circuits to perform the desired operation. When the last operation is completed, switch 102 is depressed which operates the automatic stepping mechanism to reset the switch for beginning a new cycle. When switch 102 is closed, the circuit is completed to solenoid 40 through switches 80 and 100, both of which are closed thereby energizing solenoid 40. Automatic continuous stepping in a clockwise direction is then accomplished by means of switch 80 in the manner described above as long as switch 102 is depressed. When the ratchet wheel 30 and cam wheels 4 have reached the reset position, i.e. the position for the start of a new cycle, the switch indicated on the electrical diagram by the number 100 is opened thus opening the circuit to solenoid 40. As previously pointed out, all of the microswitches 18, except one, have reverse skip switch actuators 28 whereby they are not actuated when the cams rotate in the clockwise direction and thus are not actuated upon resetting the mechanism. The only microswitch which is actuated in the clockwise direction is the switch wich is provided with a conventional actuator. This switch could be any one of the microswitches 18. The switch selected is connected in the electrical circuit as a normally closed switch in the position indicated by he number 100 of the electrical diagram. The cooperating modified cam element 12 for the selected switch is so positioned on its cam wheel 4 as to open this switch thereby opening the circuit to solenoid 40 when the reset position is reached. Once the reset position is reached, a new cycle may be begun merely by depressing switch 101 each time a new step in the operation is required.

If it is desired to repeat a step, a by-pass switch 103 may be depressed to complete the circuit to solenoid 40 and actuate the mechanism one step in the clockwise direction. Switch 103 may be depressed as many times as required to reach the position just preceding the desired position since the switches 18 (except the one noted above) are not actuated in the clockwise direction. Switch 101 may then be depressed once to bring the cam wheels 4 into the desired position to actuate the necessary switch or switches to repeat the desired step.

If it is desired to go back a substantial number of steps, switch 102 may be depressed and maintained depressed whereby the automatic stepping mechanism rotates the cams in the clockwise direction. When the position just preceding the desired position is reached, switch 102 may be released thereby stopping the rotation. The desired position is then reached by depressing switch 101 once. Thus, any desired operation may be repeated or any operation may be selected by depressing one or more of switches 101, 102 and 103 in the proper sequence.

The cycle switch of this invention is very flexible and may be used in a substantially different manner than that described in the above example since it may be operated in either direction and an automatic stepping mechanism essentially the same as that for clockwise rotation may be employed for counterclockwise rotation.

This device may be used for fully automatic operation as well as semi-automatic operation. Where the operations performed may vary in the length of time required, the semi-automatic operation, as described above, would be most suitable. However, where each operation is to be completed in a fixed time, a simple conventional timer (not shown) may be employed which closes switch 101 as each step in the sequence becomes due and upon completion of the entire process, the timer could close switch 102 for automatic resetting.

While there has been shown and described hereinabove the present preferred embodiments of this invention, it is to be understood that the invention is not limited thereto and that various changes, alterations and modifications can be made thereto without departing from the spirit and scope thereof as defined in the appended claims wherein what is claimed is:

1. A cycle switch mechanism comprising a common shaft means, a plurality of cam wheels mounted on said shaft means, cam elements mounted in synchronized relation one to the other on said cam wheels, a plurality of electric switches mounted in opposed banks on opposed sides of said shaft means and adapted to be selectively operated by the respective cam elements, a stepping device for said shaft means comprising a ratchet wheel mounted on said shaft means, at least one rocker arm and pawl means adapted to engage said ratchet wheel so as to selectively advance said wheel, shaft means and cam elements in one of a plurality of directions, solenoid means for selectively actuating said rocker arm and pawl means and adjustable cam means operatively associated with said pawl means for controlling the movement of said pawl means toward and away from said ratchet wheel and for determining the number of degrees which said ratchet wheel rotates each time said rocker arm and said pawl means are selectively actuated.

2. The cycle switch mechanism of claim 1 wherein at least one of the said switches is provided with a reverse skip switch actuator and wherein said switch mechanism contains a plurality of rocker arm and pawl means, one for selectively effecting clockwise rotation of said cam wheels and another for selectively effecting counterclockwise rotation of said cam wheels.

3. In a cycle switch mechanism provided with a rotatable shaft, means for actuating said shaft, said means including a reciprocating stepping device comprised of a ratchet wheel mounted on said rotatable shaft, a rocker arm means and a pawl means adapted to actuate said ratchet wheel to advance said cycle switch mechanism, solenoid means for selectively actuating said rocker arm means and pawl means, pin means affixed to said pawl means, adjustable cam means operatively associated with said pawl means, said pin means engaging the surface of said cam means, the position of said cam means relative to said pin means being such that the extent of movement of the tip of said pawl means toward and away from said ratchet wheel during movement of said rocker arm means is controlled by the surface of said cam means through said pin means and adjustment of the position of said cam means relative to said pin means in turn determines the number of degrees of rotation of said ratchet wheel for every stroke of said rocker arm and pawl means.

4. The apparatus of claim 3 wherein said cycle switch mechanism includes a plurality of cam wheels mounted on said shaft, interrelated cam elements mounted in synchronized relation one to the other on said cam wheels and a plurality of electric switches mounted in parallel opposed banks on opposite sides of said shaft, said switches being adapted to be selectively operated by the respective cam elements mounted on said cam wheels.

5. In a cycle switch mechanism provided with a rotatable shaft, means for actuating said shaft, said means including a reciprocating stepping device comprised of a ratchet wheel mounted on said rotatable shaft, a rocker arm means and a pawl means adapted to actuate said ratchet wheel to advance said cycle switch mechanism in a predetermined direction, a pull-type solenoid and an opposing spring for actuating said rocker arm means and pawl means, automatic means for continuously operating said stepping means comprising an electric switch electrically connected in the supply circuit for said solenoid, a lever operatively associated with said solenoid having two legs at an angle to one another pivotally mounted at a point intermediate the extremities of said legs and in a position whereby one leg of said lever is adapted to actuate said electric switch as a result of the forward movement of said rocker arm opening the circuit to said solenoid whereby the force of said spring retracts said rocker arm means and pawl means, means for exerting pressure against the side of said lever to produce a substantial amount of friction to resist pivotal movement of said lever whereby said switch is maintained open by said lever upon withdrawal of the pawl end of said rocker arm means, the angle between the legs of said lever being such that upon completion of withdrawal the pawl end of said rocker arm pivotally moves the leg of said lever which does not actuate said switch thereby moving the actuating leg of said lever away from said switch whereby said switch is closed energizing said solenoid repeating the cycle.

6. The apparatus of claim 5 wherein said cycle switch mechanism includes a plurality of cam wheels mounted on said shaft, interrelated cam elements mounted in synchronized relation one to the other on said cam wheels and a plurality of electric switches mounted in parallel opposed banks on opposed sides of said shaft and adapted to be selectively operated by the respective cam elements mounted on said cam wheels.

7. The apparatus of claim 5 wherein said stepping device includes pin means affixed to said pawl means, adjustable cam means operatively associated with said pawl means, said pin means engaging the surface of said cam means, the configuration and the position of said cam means relative to said pin means being such that the extent of movement of the tip of said pawl means toward and away from said ratchet wheel during movement of said rocker arm means is controlled by the surface of said cam means through said pin means and adjustment of the position of said cam means relative to said pin means in turn determines the number of degrees of rotation of said ratchet wheel for every stroke of said rocker arm means and pawl means.

8. The apparatus of claim 7 wherein said cycle switch mechanism includes a plurality of cam wheels mounted on said shaft, interrelated cam elements mounted in synchronized relation one to the other on said cam wheels and a plurality of electric switches mounted in parallel opposed banks on opposed sides of said shaft and adapted to be selectively operated by the respective cam elements mounted on said cam wheels.

9. The apparatus of claim 8 wherein at least one of said switches is provided with a reverse skip switch actuator and wherein two of said stepping devices are employed one for clockwise rotation of said cam wheels and one for counterclockwise rotation of said cam wheels.

References Cited in the file of this patent

UNITED STATES PATENTS

| | | |
|---|---|---|
| 1,157,296 | Caven | Oct. 19, 1915 |
| 2,212,868 | Strong | Aug. 27, 1940 |
| 2,454,882 | Oakley | Nov. 30, 1948 |
| 2,482,261 | Bordelon | Dec. 27, 1949 |
| 2,640,873 | Moebius | June 2, 1953 |
| 2,648,234 | Lester | Aug. 11, 1953 |
| 2,721,914 | Cheltz | Oct. 25, 1955 |
| 2,747,115 | Schulte | May 22, 1956 |
| 2,927,225 | Phillips | Mar. 1, 1960 |
| 2,938,970 | Constantine | May 31, 1960 |